(12) United States Patent
Büttner et al.

(10) Patent No.: US 10,090,720 B2
(45) Date of Patent: Oct. 2, 2018

(54) ROTOR COMPRISING PROTRUDING WEBS

(71) Applicant: SIEMENS AKTIENGESELLSCHAFT, München (DE)

(72) Inventors: Klaus Büttner, Hollstadt (DE); Klaus Kirchner, Ostheim (DE); Matthias Warmuth, Windshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/511,941

(22) PCT Filed: Sep. 29, 2015

(86) PCT No.: PCT/EP2015/072310
§ 371 (c)(1),
(2) Date: Mar. 16, 2017

(87) PCT Pub. No.: WO2016/050715
PCT Pub. Date: Apr. 7, 2016

(65) Prior Publication Data
US 2017/0310172 A1  Oct. 26, 2017

(30) Foreign Application Priority Data

Sep. 30, 2014 (EP) .................................. 14186942

(51) Int. Cl.
*H02K 1/24* (2006.01)
*H02K 15/02* (2006.01)
*H02K 19/10* (2006.01)

(52) U.S. Cl.
CPC ............ *H02K 1/246* (2013.01); *H02K 15/02* (2013.01); *H02K 19/103* (2013.01)

(58) Field of Classification Search
CPC ....... H02K 1/246; H02K 15/02; H02K 19/103
(Continued)

(56) References Cited

U.S. PATENT DOCUMENTS 3,202,851 A * 8/1965 Dehlendorf .............. H02K 1/16
                                                         29/521
4,538,345 A * 9/1985 Diederichs ........... H02K 15/024
                                                         29/596
(Continued)

FOREIGN PATENT DOCUMENTS

EP   2 169 805 A1   3/2010
JP   2002-095227 A  3/2002
(Continued)

*Primary Examiner* — Alex W Mok
(74) *Attorney, Agent, or Firm* — Henry M. Feiereisen LLC (57) ABSTRACT

A rotor for an electrical machine includes a laminated core with stack of sheets extending in an axial direction from a first axial end to a second axial end. The stack of sheets has layered layers in the axial direction. Each layer has a plurality of sheet areas with flow conduction blocks situated between adjacent sheet areas. At least one flow conduction block is cast with a non-ferromagnetic potting compound. The potting compound extends in the at least one flow conduction block from the first axial end to the second axial end. Fastened sheet areas, respectively, having at least one web protrudes into the potting compound. The protruding web, at least in part, extends in a direction, having a component in the axial direction. In each layer, at least one sheet area is a fastened sheet area.

15 Claims, 6 Drawing Sheets

(58) Field of Classification Search
USPC .......................................................... 310/46
See application file for complete search history.

(56) References Cited

U.S. PATENT DOCUMENTS

| | | | | |
|---|---|---|---|---|
| 4,728,842 A * | 3/1988 | Martin | ................ | B21D 39/032 29/564.2 |
| 4,809,429 A * | 3/1989 | Martin | ................ | B21D 39/032 29/564.2 |
| 5,142,178 A * | 8/1992 | Kloster | ................... | H02K 1/16 310/216.048 |
| 5,818,140 A | 10/1998 | Vagati | | |
| 5,923,112 A * | 7/1999 | Bertocchi | ................ | H01F 3/02 29/596 |
| 6,484,387 B1 * | 11/2002 | Lee | ....................... | B21D 37/08 29/596 |
| 6,742,239 B2 * | 6/2004 | Lee | ....................... | B21D 37/08 29/521 |
| 6,847,285 B2 * | 1/2005 | Sirois | ....................... | H01F 3/02 310/216.004 |
| 7,768,375 B2 * | 8/2010 | Grott | ....................... | H02K 1/06 336/234 |
| 7,859,163 B2 * | 12/2010 | Bertocchi | ................ | B32B 7/08 310/216.048 |
| 7,866,030 B2 * | 1/2011 | Grott | ....................... | H02K 1/06 29/609 |
| 2015/0162788 A1 * | 6/2015 | Tsai | ....................... | H02K 15/02 310/46 |
| 2016/0056673 A1 * | 2/2016 | Buttner | ................ | H02K 1/246 310/46 |

FOREIGN PATENT DOCUMENTS

| | | | | |
|---|---|---|---|---|
| RU | | 2359386 C2 | 6/2009 | |
| SU | | 1432669 A1 | 10/1988 | |
| WO | WO 2005020411 A1 * | | 3/2005 | ............. H02K 1/246 |

\* cited by examiner

ROTOR COMPRISING PROTRUDING WEBS

CROSS-REFERENCES TO RELATED APPLICATIONS

This application is the U.S. National Stage of International Application No. PCT/EP2015/072310, filed Sep. 29, 2015, which designated the United States and has been published as International Publication No. WO 2016/050715 A1 which claims the priority of European Patent Application, Serial No. 14186942.0, filed Sep. 30, 2014, pursuant to 35 U.S.C. 119(a)-(d).

BACKGROUND OF THE INVENTION

The invention relates to a rotor for an electrical machine. The invention also relates to an electrical machine which includes the rotor, a motor vehicle which includes the rotor, and a laminated core for the rotor. The invention further relates to a method for producing the rotor and a use of laminations for the rotor.

A rotor of this type can be fastened to a shaft, mounted rotatably about a rotation axis in the electrical machine with the aid of a first bearing device and a second bearing device.

During an operation of the electrical machine with a rotor of this type as a generator, the rotor is caused to rotate about the rotation axis by mechanical energy. By means of the magnetic interaction between magnetic poles of the rotor and the stator via an air gap, the mechanical energy can be converted into electrical energy. The electrical energy can be extracted at least at one winding which is fastened to the stator and contributes to a formation of the magnetic poles of the stator, by connecting an electrical consumer. In order to form the magnetic pole of the rotor, a different design of the rotor in one direction about the rotation axis and/or an implementation of the rotor can herein contribute thereto that the magnetic fields are generated permanently or in operation of the electrical machine.

In an operation of the electrical machine with a rotor of this type as a motor, electrical energy is supplied by means of the at least one winding, and through the magnetic interaction between the magnetic poles of the stator and the rotor across the airgap, electrical energy is converted into mechanical energy. Herein, the rotor is induced to rotate about the rotation axis and mechanical energy can be output at the shaft to a mechanical consumer in the form of a rotary movement.

Furthermore, reluctance rotors are known as examples of a rotor of this type inter alia from U.S. Pat. No. 5,818,140 A. A rotor is therein described, the laminated core of which consists of rotor laminations which have cut-outs. Situated between the individual lamination regions, in the flux barriers generated by cut-outs, is air which acts as a magnetic flux block. During operation of an electrical machine with this rotor, due to the anisotropy of the magnetic conductance, magnetic poles which interact magnetically with the magnetic poles of the stator form on the rotor. The anisotropy is brought about in this rotor by the cut-outs in the rotor laminations. However, the cut-outs lead to a weakening of the mechanical stability of the laminated core. The lower mechanical stability restricts the use of this rotor dependent upon the rotary speed.

From JP 2002 095227 A, there is known a reluctance rotor in which the flux barriers are filled with synthetic resin. The radially adjacent lamination regions herein have trapezoid cut-outs into which the synthetic resin also flows during filling. By this means, the lamination regions are connected to the hardened synthetic resin by means of a dovetail joint. The trapezoid cut-outs in the lamination regions impair the efficiency of the motor and thus the quality of the motor, since the magnetic flux is impeded.

SUMMARY OF THE INVENTION

It is an object of the invention to achieve a technical contribution for an electrical machine or its use, with which a rotor can be made available economically in high quality for a use of the electrical machine.

According to one aspect of the invention, the object is achieved by a rotor for an electrical machine which rotor includes
  a laminated core which extends in an axial direction from a first axial end to a second axial end,
  wherein the laminated core includes layers stacked in the axial direction,
  wherein each layer includes a plurality of lamination regions,
  wherein flux barriers are present which lie between adjacent lamination regions,
  wherein at least one flux barrier is filled with a non-ferromagnetic casting compound,
  wherein the casting compound extends in the at least one flux barrier, in each case, from the first axial end to the second axial end,
  wherein fastened lamination regions are present which each have a web inwardly protruding into the casting compound,
  wherein the inwardly protruding web extends at least partially in at least one direction which has a component in the axial direction,
  wherein in each layer at least one first lamination region is a fastened lamination region.

According to another aspect of the invention, the object is also achieved by an electrical machine which includes a rotor as set forth above and
  a stator which during an operation of the electrical machine interacts magnetically with the rotor via an air gap,
  wherein the rotor is mounted rotatably about a rotation axis, the rotation axis extending in the axial direction.

According to still another aspect of the invention, the object is also achieved by a motor vehicle which includes a rotor as set forth above.

According to still another aspect of the invention, the object is also achieved by a laminated core for an inventive rotor, which laminated core extends in an axial direction from a first axial end to a second axial end,
  wherein the laminated core includes layers stacked in the axial direction,
  wherein each layer includes a plurality of lamination regions,
  wherein flux barriers are present which lie between adjacent lamination regions,
  wherein fastened lamination regions are present which each have at least one inwardly protruding web, the inwardly protruding web extending at least partially in at least one direction which has a component in the axial direction,
  wherein the inwardly protruding webs extend into free spaces of at least one flux barrier for the casting compound,
  wherein in each layer at least one first lamination region is a fastened lamination region.

According to still another aspect of the invention, the object is also achieved by a method for producing a rotor as set forth above, wherein the laminated core is provided,
which includes layers stacked in the axial direction,
wherein each layer includes a plurality of lamination regions,
wherein free spaces for the flux barriers are present, lying between adjacent lamination regions,
wherein the free spaces of at least one flux barrier are filled in the axial direction between the inwardly protruding webs, the inwardly protruding webs extending at least partially in at least one direction which has a component in the axial direction.

According to still another aspect of the invention, the object is also achieved through a use of laminations for a rotor as set forth above, with the laminations being used for fastened lamination regions of the rotor,
which adjoin at least one flux barrier, wherein the at least one flux barrier is filled with the non-ferromagnetic casting compound, and
which have webs inwardly protruding into the casting compound, which extend at least partially in at least one direction which has a component in the axial direction.

The object is advantageously achieved according to the invention in that the rotor, in particular the laminated core, is advantageously stabilized mechanically, advantageously economically in high quality, by means of the webs inwardly protruding into the casting compound at least partially in a direction with a component in the axial direction. By means of the component in the axial direction and by means of the inward protrusion of the webs, there are advantageously existing, in particular mainly enlarged, border surfaces between each inwardly protruding web and the casting compound which are used for a mechanical stabilization of the laminated core by means of a positive engagement advantageously directed in the axial direction between the border surfaces and the casting compound. In particular, these positive engagements can mechanically stabilize an inventive rotor economically in high quality if the inwardly protruding webs mostly extend in directions which have a component in the axial direction. In particular, the boundary surfaces are advantageously enlarged thereby. In addition, by means of the components in the axial direction and by means of the inward protrusion of the webs, a mechanical stabilization against a displacement of a fastened lamination region in a direction perpendicular to the axial direction relative to a fastened lamination region adjacent in the axial direction is advantageously achieved. Furthermore, the influence of the mechanical stability of the rotor on operation of the electrical machine is advantageously reduced. Thus, a reduction of areas of the lamination regions is advantageously prevented, for example. Thus a reduction of the areas for conducting the magnetic flux during operation of the electrical machine can advantageously be prevented. This contributes to a high quality, in particular a high efficiency level, of an inventive electrical machine.

In an inventive rotor, the at least one flux barrier is filled with a non-ferromagnetic casting compound. Non-ferromagnetic should be understood herein, in particular, to be non-soft-magnetic material. In particular, the casting compound has a relative permeability that is less than 100.

The rotor and the laminated core have cross-sectional planes which extend perpendicularly to the axial direction. The cross-sectional planes extend mainly in radial directions which extend perpendicularly to the axial direction. A rotation axis of the rotor for operation of an inventive electrical machine or an inventive motor vehicle extends in the axial direction. The first lamination regions of the layers lie in the axial direction substantially over one another. Essentially this means, for example, that the inwardly protruding webs are not considered and, if relevant, the lamination regions of layers following one another in the axial direction and thus also their first lamination regions are displaced, due to an inclination of the laminated core to suppress cogging torques, relative to one another by an inclination angle of the inclination.

In an inventive rotor, for each flux barrier filled with the non-ferromagnetic casting compound, a flux barrier filled with the non-ferromagnetic casting compound can be present point-symmetrically about the rotation axis of the rotor, wherein webs are present protruding inwardly into these flux barriers. Thus, an inventive rotor can be mechanically stabilized, advantageously economically in high quality in that an inventive mechanical stabilization evokes a small imbalance on rotation of the rotor about the rotation axis during operation of an inventive electrical machine or an inventive motor vehicle. Herein, the flux barriers with the inwardly protruding webs in the transverse planes are substantially point symmetrically arranged about the respective intersection point of a transverse plane with the rotation axis.

The lamination regions in a cross-sectional plane perpendicularly to the axial direction can be made of a soft magnetic material, in particular magnetic sheet steels. Thus an electrical machine can be made available advantageously economically in high quality in that low core losses occur in an alternating magnetic flux through the soft magnetic material during operation of the electrical machine.

An inventive electrical machine has the further advantage that in an inventive rotor, it can be made available economically in high quality for use at high rotary speeds. The inventive rotor can advantageously be mechanically stabilized in a space-saving manner for use in applications with a high rotary speeds by means of the webs inwardly protruding into the casting compound which extend at least partially in at least one direction which has a component in the axial direction. Furthermore, an inventive electrical machine with an inventive rotor in high quality, in particular with a high level of efficiency can be used economically for applications which require high rotary speeds, for example, in fan drives or compressor drives without gearing.

An inventive motor vehicle has the further advantage that an inventive rotor can be produced for an inventive motor vehicle in high quality and in a small size. The rotor of the inventive motor vehicle can advantageously be stabilized for high rotary speeds in a space saving manner by means of the webs inwardly protruding into the casting compound in order to make a high power output available for small dimensions, in particular also a low weight, in particular as a drive motor for the inventive motor vehicle. Further advantageously, an inventive rotor can advantageously form, economically in high quality, an overall bond with a shaft to which the rotor is fastened with which the natural bending frequency of an inventive rotor with the shaft in an operation of the motor vehicle experiences low deflections in a direction perpendicularly to the axial direction. Thus in an inventive motor vehicle, the air gap between the rotor and the stator can advantageously have a low width, which advantageously enables a high level of efficiency. An inventive motor vehicle can have an inventive electrical machine with an inventive rotor, in particular as the drive motor of the motor vehicle or advantageously, in a space-saving manner, the stator which during operation of the motor vehicle cooperates magnetically with the rotor across an air gap can be fastened with a fastening apparatus to the motor vehicle, wherein the rotor is mounted rotatably about a rotation axis, wherein the rotation axis extends in the axial direction. Thus, a shell which surrounds at least one subregion of the motor vehicle can advantageously receive the stator and an inventive rotor in space-saving manner.

An inventive laminated core has the further advantage that the webs inwardly protruding with a component in the axial direction can advantageously be economically manufactured by deforming protruding webs at the fastened lamination regions.

An inventive laminated core can advantageously be held together by means of a fixing apparatus in order to be able to transport and/or store it economically. The fixing apparatus can have at least one fixing element which extends in at least one flux barrier from the first axial end to the second axial end. Thus, the laminated core can advantageously be secured economically in high quality during transport against falling apart and rotation of the layers.

An inventive method for manufacturing an inventive rotor has the further advantage that the rotor can advantageously be made available economically in high quality as a unit. An inventive rotor can advantageously be further processed as a mechanically stable unit following casting. In the further processing, for example, an economical subsequent processing of the rotor can thus be carried out so that it can advantageously be made available in high quality.

An inventive use of laminations for an inventive rotor has the further advantage that through the use of laminations, the inventive inwardly protruding webs can advantageously be produced economically in high quality from lamination protrusions at the edges of the fastened lamination regions toward the flux barriers. Inter alia, it is not entirely essential for complex, for example dovetail-shaped, cut-outs to be undertaken at the edges of the laminations. Rather, the regions of the flux barriers can be stamped out and thereby, advantageously, lamination protrusions can form at the edges.

In an inventive use of the laminations, advantageously, the layers of the laminated core can be manufactured economically in high quality with fastened lamination regions which each have at least one inwardly protruding web, wherein said web extends at least partially in at least one direction which has a component in the axial direction. Advantageously, in a further step, the layers with the lamination regions can be stacked into a laminated core and therein free spaces of the at least one flux barrier can be formed for the casting compound into which the webs protrude.

Advantageous embodiments of the invention are disclosed in the dependent claims.

Thus, one embodiment of an inventive rotor for an electrical machine is advantageous in which a layer has an adjacent layer in which at least one first lamination region is present which has an adjacent inwardly protruding web, the adjacent inwardly protruding web extending in a rotation direction adjacently following a first inwardly protruding web of the first lamination region of the layer in the casting compound. Thus advantageously, the positive engagements between the inwardly protruding webs and the casting compound can be provided economically in high quality. Thus, the layers can advantageously be mechanically stabilized economically in high quality in the axial direction against displacement in a transverse plane and rotating in a rotation direction. The rotation in the rotation direction about a rotation axis extending in the axial direction is advantageously prevented in that the adjacent inwardly protruding web extends adjacently following the first inwardly protruding web, since between the adjacent inwardly protruding web and the first inwardly protruding web, only a small volume of casting compound is present which can, for example, undergo a deformation through torques acting thereon during operation of an inventive electrical machine or an inventive motor vehicle, wherein the deformation of the lower volume of casting compound takes place over a relatively small distance. If a material is used for the casting compound for which relatively high forces are needed for the deformation, then a spacing between the adjacent inwardly protruding web and the first inwardly protruding web can be selected to be greater, i.e. the smaller volume can be made larger in order to achieve the same small distance in the deformation during operation of an inventive electrical machine or an inventive motor vehicle.

In a further advantageous embodiment of an inventive rotor for an electrical machine, in each layer, a second lamination region is a fastened lamination region, wherein an inwardly protruding web of the first lamination region is separated as an opposite inwardly protruding web from a first inwardly protruding web of the second lamination region by the casting compound. Thus, in an inventive rotor, the first and second lamination regions can be mechanically stabilized against displacement both in the axial direction and also in a transverse plane, advantageously economically in high quality. Thus, dimensions of the flux barriers can also advantageously be maintained, even under the influence of large forces during operation of the electrical machine, for example, due to high rotary speeds of the rotor, in order advantageously to achieve small changes of the electromagnetic properties of an inventive rotor.

Advantageously, by means of the components in the axial direction of the first inwardly protruding web and of the opposing inwardly protruding web, enlarged boundary areas between the webs and the casting compound can be present and nevertheless a separation can be present between the opposite inwardly protruding web and the first inwardly protruding web by means of the casting compound. Furthermore, a mechanical stabilization of the first and second lamination regions against distortion of a layer, particularly at a flux barrier, can thus advantageously be enabled, advantageously economically in high quality, wherein the flux barrier extends between the first and second lamination regions from the first axial end to the second axial end of the laminated core. Similarly to the first lamination regions, the second lamination regions of the layers also lie in the axial direction substantially over one another. Thus, a contact of the individual fastened lamination regions, in particular a low-resistance short-circuit between the fastened lamination regions of one layer can also advantageously be prevented with a low spacing of the webs. Advantageously for an inventive method for producing an inventive rotor, also, the advantageous separation of the webs by the casting compound can be maintained economically in high quality. Advantageously, a high quality can thus be enabled economically with an inventive method for production over a large production quantity of rotors produced.

In a further advantageous embodiment of an inventive rotor for an electrical machine, the first inwardly protruding web of the first lamination region is the layer of the opposite inwardly protruding web. Thus, advantageously, mechanical stabilization of an inventive rotor at the first and second lamination regions can take place in the axial direction and also against displacement in a transverse plane, economically in high quality. Thus, advantageously, the dimensions of the flux barriers can be maintained, even under the influence of large forces during an operation of the electrical machine, for example, by means of a high rotary speed of an inventive rotor about the rotation axis, economically in high quality, by means of the first inwardly protruding webs.

In a further advantageous embodiment of an inventive rotor for an electrical machine, no inwardly protruding web which lies in the axial direction beyond an inwardly protruding web of the layer extends into the casting compound of the flux barriers between one layer and a layer adjacent to the layer. Thus advantageously, the positive engagements between the inwardly protruding webs and the casting compound can be provided economically in high quality in that the casting compound can be present in the free spaces round an inwardly protruding web.

In order that no inwardly protruding web extends into the casting compound of the flux barriers between the layer and the layer adjacent to the layer, adjacent layers can be present between the layer and the adjacent layer. Adjacent layers advantageously have no inwardly protruding webs which lie in the axial direction beyond an inwardly protruding web of the layer. A plurality of adjacent layers advantageously enable the filling of the free spaces of the flux barriers economically in high quality, in particular between the inwardly protruding webs lying over one another in the axial direction if the casting compound has such a viscosity that it can penetrate only with difficulty into a free space with the width of a layer thickness of an adjacent layer during filling.

In a further advantageous embodiment of an inventive rotor for an electrical machine, a third lamination region which has an adjacent inwardly protruding web is present in the adjacent layer wherein the adjacent inwardly protruding web extends, against the rotation direction, adjacently following a first inwardly protruding web of a third lamination region of the layer in the casting compound. Thus advantageously, the positive engagements between the inwardly protruding webs and the casting compound can be provided economically in high quality. Thus, the layers can advantageously be mechanically stabilized economically in high quality in the axial direction against a displacement in a transverse plane and against a rotation in a transverse plane contrary to the rotation direction, and in advantageous combination with an embodiment described above, can also be mechanically stabilized in the rotation direction. The rotation is advantageously prevented in that the adjacent inwardly protruding web extends following the first inwardly protruding web, since between the adjacent inwardly protruding web and the first inwardly protruding web, only a small volume of casting compound is present.

In a further advantageous embodiment of an inventive rotor for an electrical machine, the at least one inwardly protruding web of a fastened lamination region has arisen by means of bending a subregion of a lamination piece wherein the lamination piece comprises the fastened lamination region. Thus, advantageously, the at least one inwardly protruding web can be produced from the lamination piece economically in high quality.

In a further advantageous embodiment of an inventive rotor for an electrical machine, in each layer, the lamination regions consist of a lamination. Thus, advantageously, an inventive laminated core or rotor can be produced mainly from laminations economically in high quality.

In a further advantageous embodiment of an inventive rotor for an electrical machine, the fastened lamination regions have boundaries which each have at least one inwardly protruding web wherein each layer results in relation to these boundaries from an adjacent layer by rotation of the adjacent layer through a twist angle, wherein in each layer at least one inwardly protruding web is arranged asymmetrically to at least one first inwardly protruding web in relation to a symmetry axis, the symmetry axis being an angle bisector of the twist angle. Thus advantageously, an inventive rotor can be mechanically stabilized against forces arising in the axial direction and radial directions, economically in high quality, wherein the forces arise, in particular, during an operation of an inventive electrical machine or an inventive motor vehicle with the inventive rotor. This is advantageously achieved in that the inwardly protruding webs are present in different radial directions in an inventive rotor and simultaneously the inwardly protruding webs protrude into the casting compound. The inward protrusion of the webs is herein advantageously achieved in that the inwardly protruding webs do not lie over one another in the axial direction by the twist angle in two adjacent layers. An inventive method for manufacturing an inventive rotor or an inventive use of laminations for an inventive rotor, can thus advantageously achieve a mechanical stabilization of the rotor economically in high quality in that adjacent stacked layers are rotated through the twist angle relative to one another.

The at least one inwardly protruding web which is asymmetrically arranged in relation to at least one first inwardly protruding web in relation to the symmetry axis can be at least one adjacent inwardly protruding web. Thus, a mechanical stabilization of the layers of an inventive rotor in the axial direction against a displacement in a transverse plane and against a rotation in a transverse plane in the rotation direction can advantageously take place economically in high quality.

The boundaries of the fastened lamination regions are between a first circle radius and a second circle radius axially symmetrically to the symmetry axis. Thus a mechanical stabilization of a magnetic pole, in particular an arrangement of a plurality of magnetic pole regions of the magnetic poles, of an inventive rotor can advantageously take place economically in high quality in different radial directions of the arrangement in advantageously equal amounts.

The at least one inwardly protruding web can have a spacing from the first circle radius which is smaller than a spacing of the at least one first inwardly protruding web from the second circle radius, wherein the twist angle is measured from the first circle radius to the second circle radius, wherein the at least one inwardly protruding web is present in the rotation direction before the first circle radius and the at least one first inwardly protruding web is present in the rotation direction before the second circle radius. Thus, the layers can advantageously be mechanical stabilized in the axial direction against a displacement of a transverse plane and a rotation in a rotation direction, economically in high quality, in that advantageously the spacings from the first and second circle radius simply differ.

A further inwardly protruding web which is arranged asymmetrically to a further first inwardly protruding web in relation to the symmetry axis can have a spacing from the first circle radius which is smaller than a spacing of the further first inwardly protruding web from the second circle radius, wherein the twist angle is measured from the first circle radius to the second circle radius, wherein the further inwardly protruding web is provided in the rotation direction after the first circle radius and the further first inwardly protruding web is provided in the rotation direction after the second circle radius. Thus, a mechanical stabilization of the layers of an inventive rotor in the axial direction can advantageously take place economically in high quality against a displacement of a transverse plane and against a rotation in a transverse plane in and against the rotation direction in that the spacings from the first and second circle radius advantageously simply differ.

The twist angle can be 90°. Thus an inventive laminated core or rotor can be manufactured in high quality since a rotation through 90° in a stacking of adjacent layers is an advantageously simple method step.

In a further advantageous embodiment of an inventive rotor for an electrical machine, the rotor has a further layer which continues the stacked layers at the second axial end of the laminated core in the axial direction, the further layer having at most lamination regions which have no inwardly protruding webs. Thus, the further layer can advantageously continue an axial end of the laminated core economically in high quality, wherein one surface of the rotor is provided at the second axial end of the laminated core without webs protruding in the axial direction. This contributes thereto that an inventive rotor can advantageously be manufactured or used economically in high quality, since there is no need to pay heed to protruding webs at the axial end.

The rotor can have a layer with casting compound in the axial direction in front of the stacked layers, which is firmly bonded to the casting compound in the flux barriers, wherein the further layer also has the casting compound which is connected at the second axial end of the laminated core to the casting compound of the flux barriers. Thus, at the first and second ends of the laminated core, support elements can be manufactured during filling of the flux barriers with the casting compound, advantageously economically in high quality. In addition, the casting compound can advantageously consist of an electrically conductive material, in particular a metal, wherein the casting compound forms a device of the rotor which contributes to the formation of the magnetic poles of an inventive rotor in an operation of an inventive electrical machine. Thus, advantageously, an inventive mechanical stability can be achieved economically in high quality and simultaneously, a device of the rotor can be made available which can be used partially for operation of an inventive electrical machine, for example, on ramping up as a start-up aid of the electrical machine or also for an operation of the electrical machine after the start-up.

A further advantageous embodiment of an inventive rotor for an electrical machine respectively has a layer with fastened lamination regions of mutually adjacent circular sectors; which are each delimited by two d-circle radii, wherein in each layer with fastened lamination regions, though the lamination regions a plurality of bent, strip-shaped flux conduction portions are formed, respectively separated from one another by the flux barriers, which each extend in their longitudinal extent transversely to a q-axis of the rotor, wherein the q-axis extends along an angle bisector of the two d-circle radii. Thus, advantageously, an anisotropy of the magnetic conductivity of an inventive rotor for operation of an inventive electrical machine can be made available economically in high quality. The two d-circle radii each extend along a d-axis of the rotor.

The lamination regions can be completely separated from one another by the flux barriers in each layer. By means of an inventive mechanical stabilization of an inventive rotor, advantageously, economically in high quality, an outer ring for the holding together of the lamination regions of the rotor during operation of the electrical machine can be dispensed with or it can have a smaller width. Since the outer ring in the electrical machine extends in radial directions at a small spacing or directly along the air gap, it enlarges the spacing of the magnetic poles of the rotor from the magnetic poles of the stator, which results in large dimensions or low efficiency levels of the electrical machine. Furthermore, the contribution of the outer ring for forming the magnetic poles of the rotor can be small or even reduces its effect during an operation of the electrical machine. Advantageously, in an inventive method for producing an inventive rotor, following the filling of the flux barriers, the outer ring can be removed economically in high quality, in particular by metal-cutting machining. By means of an inventive mechanical stabilization, an inventive rotor can herein advantageously be processed economically in high quality as a mechanically stable unit.

Advantageous embodiments of inventive rotors, electrical machines, motor vehicles, laminated cores and methods for manufacturing an inventive rotor and an inventive use of laminations for such a rotor are advantageously given by combination of some or more of the features described.

BRIEF DESCRIPTION OF THE DRAWINGS

The above described properties, features and advantages of this invention as well as the manner and means by which they can be achieved are more clearly and distinctly described in the context of the following description of the exemplary embodiments, which will now be described in greater detail by reference to the drawings, in which.

DETAILED DESCRIPTION OF THE EMBODIMENTS

Figure 1:
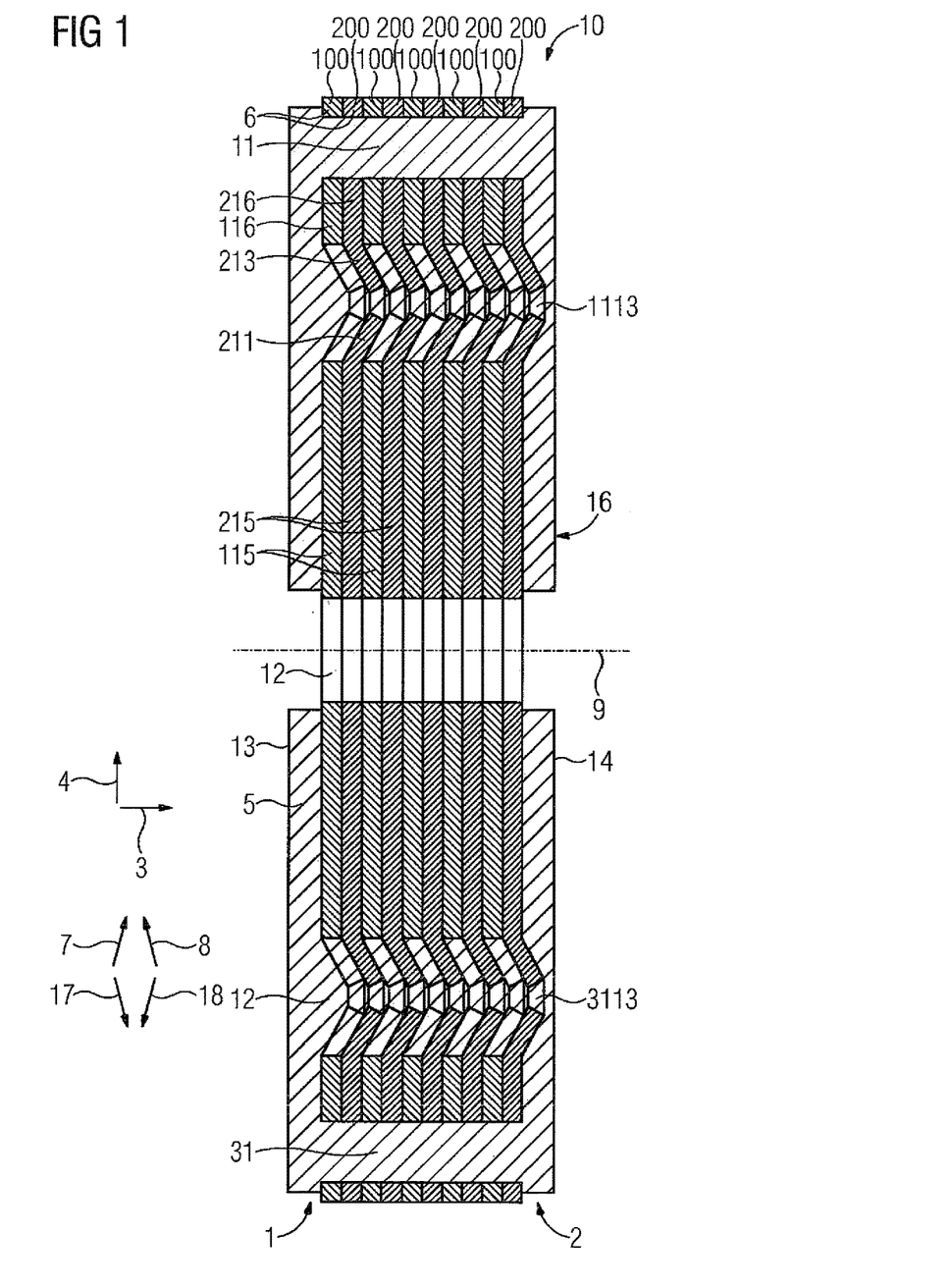
FIG. 1 is an exemplary embodiment of a rotor.

FIG. 1 shows an exemplary embodiment of a rotor 10 for an electrical machine 50, the rotor 10 comprising a laminated core 20 which has layers 100, 200 stacked in an axial direction 3. The laminated core 20 extends in the axial direction 3 from a first axial end 1 to a second axial end 2, each layer 100, 200 having a plurality of lamination regions 115, 116, 215, 216. In order to explain the structure of the exemplary embodiment, the layers 100, 200 are denoted alternatingly as layer 100 and as adjacent layer 200, although in this exemplary embodiment they are made of identically configured laminations 15 (see FIGS. 2 and 3). However, the layers 100, 200 are stacked alternatingly rotated through a twist angle β in the layer according to FIGS. 2 and 3. The laminations 15 are manufactured from a magnetic steel sheet which has a thickness of less than 1 mm, typically 0.5 mm or 0.35 mm. Each layer 100, 200 has a plurality of lamination regions 6, 16, 115, 116, 215, 216 wherein flux barriers 11, 31, 1113, 3113 are present which lie between adjacent lamination regions (6, 115, 116, 215, 216). The adjacent lamination regions (6, 115, 116, 215, 216) are lamination regions which adjoin the flux barriers 11, 31, 1113, 3113. The casting compound 5 extends into the flux barriers 11, 31, 1113, 3113, in each case, from the first axial end 1 to the second axial end 2. In each layer 100, 200 at least one first lamination region 115, 215 is a fastened lamination region 115, 215. The fastened lamination regions 115, 116, 215, 216 each have at least one web 111, 113, 211, 213 inwardly protruding into the casting compound 5, wherein the inwardly protruding webs 111, 113, 211, 213 extend in at least one direction 7, 8, 17, 18 which have a component in the axial direction 3. The inwardly protruding webs 111, 113 of the layers 100 are covered by the casting compound 5 in the longitudinal section of FIG. 1. The inwardly protruding webs 211, 213 of a fastened lamination region 215, 216 have arisen by means of bending a subregion of a lamination piece wherein the lamination piece comprises the fastened lamination region 215, 216. In the exemplary embodiment of FIG. 1, the inwardly protruding webs 211, 213 have been angled down relative to the fastened lamination region 215, 216 substantially as a whole by approximately 45°. The rotor 10 has a further layer 14 which continues the stacked layers 100, 200 at the second axial end 2 of the laminated core in the axial direction 3, wherein the further layer 14 has at most lamination regions which have no inwardly protruding webs 211, 213. A surface 16 of the rotor 10 is thus continued at the second axial end 2 of the laminated core by the further layer 14 wherein the surface 16 of the rotor 10 is present at the second axial end 2 of the laminated core without webs 211, 213 protruding in the axial direction 3. The rotor 10 has a layer 13 in front of the stacked layers 100, 200 in the axial direction 3 with casting compound 5, which is firmly bonded to the casting compound 5 in the flux barriers 11, 31, 1113, 3113, wherein the further layer 14 also has the casting compound 5 which is firmly bonded at the second axial end 2 of the laminated core to the casting compound 5 of the flux barriers 11, 31, 1113, 3113. The layer 13 with the casting compound 5 and the further layer 14 with the casting compound 5 can be manufactured from a synthetic resin as the casting compound 5. The casting compound 5 can, however, advantageously consist of an electrically conductive material, the casting compound then forming a device of the rotor 10 which contributes to the formation of the magnetic poles in the operation of an electrical machine 50. The configuration of the rotor in the exemplary embodiment of FIG. 1 is a shaded-pole winding which is mainly used as a start-up aid of an electrical machine 50 with the rotor 10 on operation of the electrical machine 50. A metal is used as the electrically conductive material. In the exemplary embodiment of FIG. 1, aluminum is used, being able to be applied to the rotor 10 in a method for manufacturing the rotor 10 with a diecasting method. The rotor 10 has a rotation axis 9 which extends in the axial direction 3. The laminated core has a passage 12 for receiving a shaft 51. The layers 100, 200 have circular cut-outs for the passage 12. The rotor 10 and the laminated core have cross-sectional planes which extend perpendicularly to the axial direction 3. The cross-sectional planes extend mainly in radial directions 4 which extend perpendicularly to the axial direction 3. The rotor 10 extends, starting from the rotation axis 9, substantially in all radial directions 4 in the same width. In FIG. 1, only one of the radial directions is shown as the arrow 4.

Figure 2:
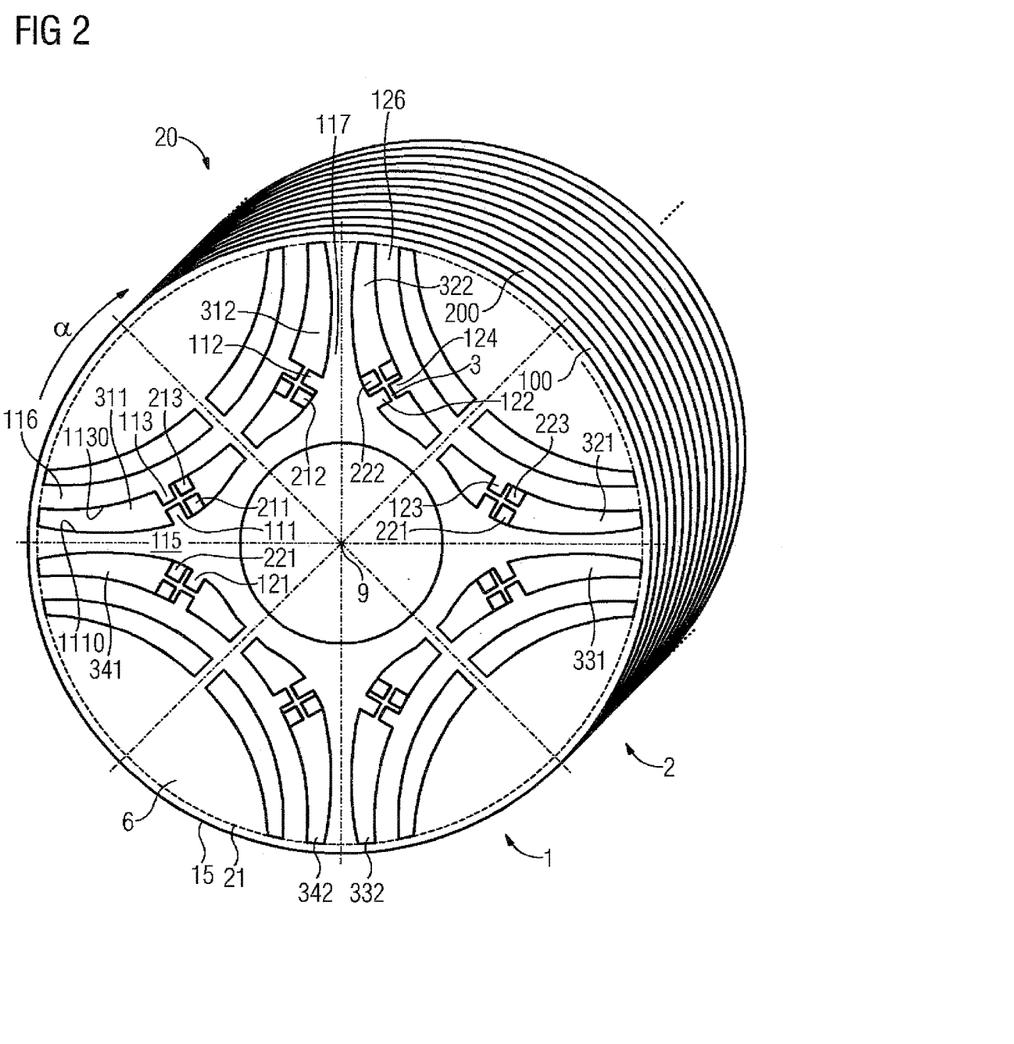
FIG. 2 is an exemplary embodiment of a laminated core.
Figure 3:
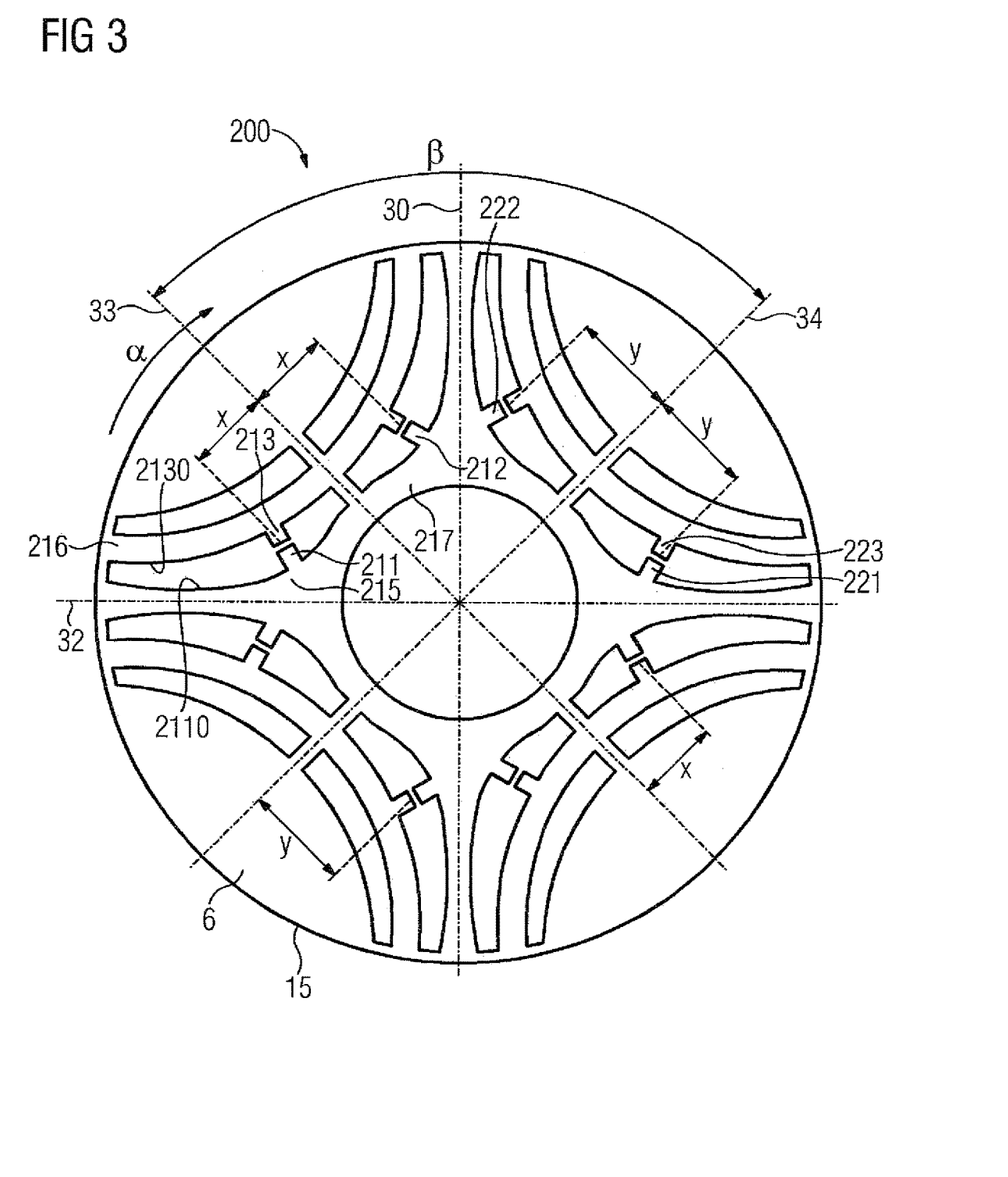
FIG. 3 is an exemplary embodiment of a lamination used in FIGS. 1 and 2 as an adjacent layer in the orientation of FIG. 3.

FIG. 2 shows an exemplary embodiment of a laminated core 20 for a rotor 10, the laminated core 20 comprising layers 100, 200 stacked in the axial direction 3. Each layer 100, 200 has a plurality of lamination regions 6, 115, 116, 117, 126 wherein flux barriers are present which lie between adjacent lamination regions 6, 115, 116, 117, 126. The laminated core 20 extends in the axial direction 3 from the first axial end 1 to the second axial end 2. Lamination regions designated fastened lamination regions 116, 117, 126 are present, each having at least one inwardly protruding web 111, 112, 113, 121, 122, 124, the inwardly protruding webs extending at least partially in at least one direction 7, 8, 17, 18 which have a component in the axial direction 3. The inwardly protruding webs extend into free spaces 311, 332 of the flux barriers 1113, 3113 for the casting compound 5. Arranged in each layer 100, 200, at least one first lamination region 115, 215 is a fastened lamination region. The first lamination region 215 of the layer 200 is shown in FIG. 3. The first lamination regions 115, 215 of the layers 100, 200 lie in the axial direction 3 substantially over one another. In the exemplary embodiments of FIGS. 1 and 2, the first lamination regions 115, 215 of the layers 100, 200 overlap one another completely apart from the inwardly protruding webs 111, 211.

In an exemplary embodiment of a method for manufacturing a second exemplary embodiment of a rotor, the laminated core 20 of FIG. 2 is provided and free spaces 311, 312, 321, 322, 331, 332, 341, 342 of the flux barriers 1113, 3113 are filled in the axial direction 3 between the webs 111, 112, 113, 121, 122, 124, 211, 212, 213, 221, 222 inwardly protruding into the free spaces, wherein the inwardly protruding webs at least partially extend in at least one direction 7, 8, 17, 18 which has a component in the axial direction 3. In an exemplary embodiment of the rotor 10 in FIG. 1, all the flux barriers 11, 31, 1113, 3113 are filled with the casting compound 5. According to the reference signs used for the free spaces, in this part of the description, in the exemplary embodiment of a method for manufacturing the rotor and in the second exemplary embodiment of a rotor, only the flux barriers 1113, 3113 with inwardly protruding webs are filled. Herein—as shown in the laminated core 20 in FIG. 2—only in the case of the flux barriers are inwardly protruding webs present, which extend furthest toward the rotation axis 9 (i.e. the flux barriers which correspond to the free spaces 311, 312, 321, 322, 331, 332, 341, 342). Thus in this case, for each flux barrier filled with the non-ferromagnetic casting compound 5, a flux barrier filled with the non-ferromagnetic casting compound 5 can be present point-symmetrically about the rotation axis 9 of the rotor, wherein webs are present inwardly protruding into these flux barriers.

In a second exemplary embodiment of a method for manufacturing the rotor 10, in addition to the exemplary embodiments of a manufacturing method already described, the free spaces of the remaining flux barriers 11, 31 between the lamination regions 6, 116 are filled in the axial direction 3. Following the filling of all the flux barriers 11, 31, 1113, 3113, an outer ring 21 is removed by a metal-removing machining method with a lathe.

The further description of FIG. 2 makes reference to the rotor of the exemplary embodiment of FIG. 1 in which the free spaces 311, 312, 321, 322, 331, 332, 341, 342 are filled with the casting compound 5. A corresponding description of FIG. 2 for the laminated core 20 can be derived correspondingly adapted for free spaces in place of the casting compound. One layer 100 of the laminated core 20 has an adjacent layer 200 in which the first lamination region 115 is present which has an adjacent inwardly protruding web 211, wherein the adjacent inwardly protruding web 211 extends adjacently in a rotation direction α following a first inwardly protruding web 111 of the first lamination region 115 of the layer 100 in the casting compound 5. In FIG. 2, only a cross-sectional plane of the laminated core 20 or of the rotor 10 can be seen. Considering the other cross-sectional planes of the laminated core 20 or of the rotor 10, each layer 100, 200 with a fastened lamination region 115, 215 has an adjacent layer 100, 200 with an adjacent inwardly protruding web 211, 122. In each layer 100, 200 of the rotor 10, a second lamination region 116, 216 is also a fastened lamination region, wherein an inwardly protruding web 111, 211 of the first lamination region 115, 215 is separated as an opposite inwardly protruding web 111, 211 from a first inwardly protruding web 112, 213 of the second lamination region 116, 216 by the casting compound 5. The first inwardly protruding web 111 of the first lamination region 115 of the layer 100 is the opposite inwardly protruding web 111. In the adjacent layers 200, a third lamination region 217 is present which has an adjacent inwardly protruding web 212, wherein this inwardly protruding web extends, against the rotation direction, a adjacently following a first inwardly protruding web 112 of a third lamination region 117 of the layer 100 in the casting compound 5. In the rotor 10 or the laminated core 20, in each layer 100, 200, the lamination regions 6, 115, 116, 117, 126, 215, 216, 217 consist of a lamination 15.

In an exemplary embodiment of a use of laminations 15 for the rotor 10, said laminations 15 are used for all lamination regions 6, 115, 116, 117, 126, 215, 216, 217 of the rotor 10 which comprise the fastened lamination regions 115, 116, 117, 126, 215, 216, 217, wherein the fastened lamination regions abut at least one flux barrier 11, 31, 1113, 3113 that is filled with the non-ferromagnetic casting compound 5 and comprise the webs 111, 112, 113, 121, 122, 124, 211, 212, 213, 221, 222 inwardly protruding into the casting compound 5, which extend at least partially in at least one direction 7, 8, 17, 18 which has a component in the axial direction 3. The laminations 15 have the same dimensions and the same cut-outs have been made in the laminations 15.

Figure 4:
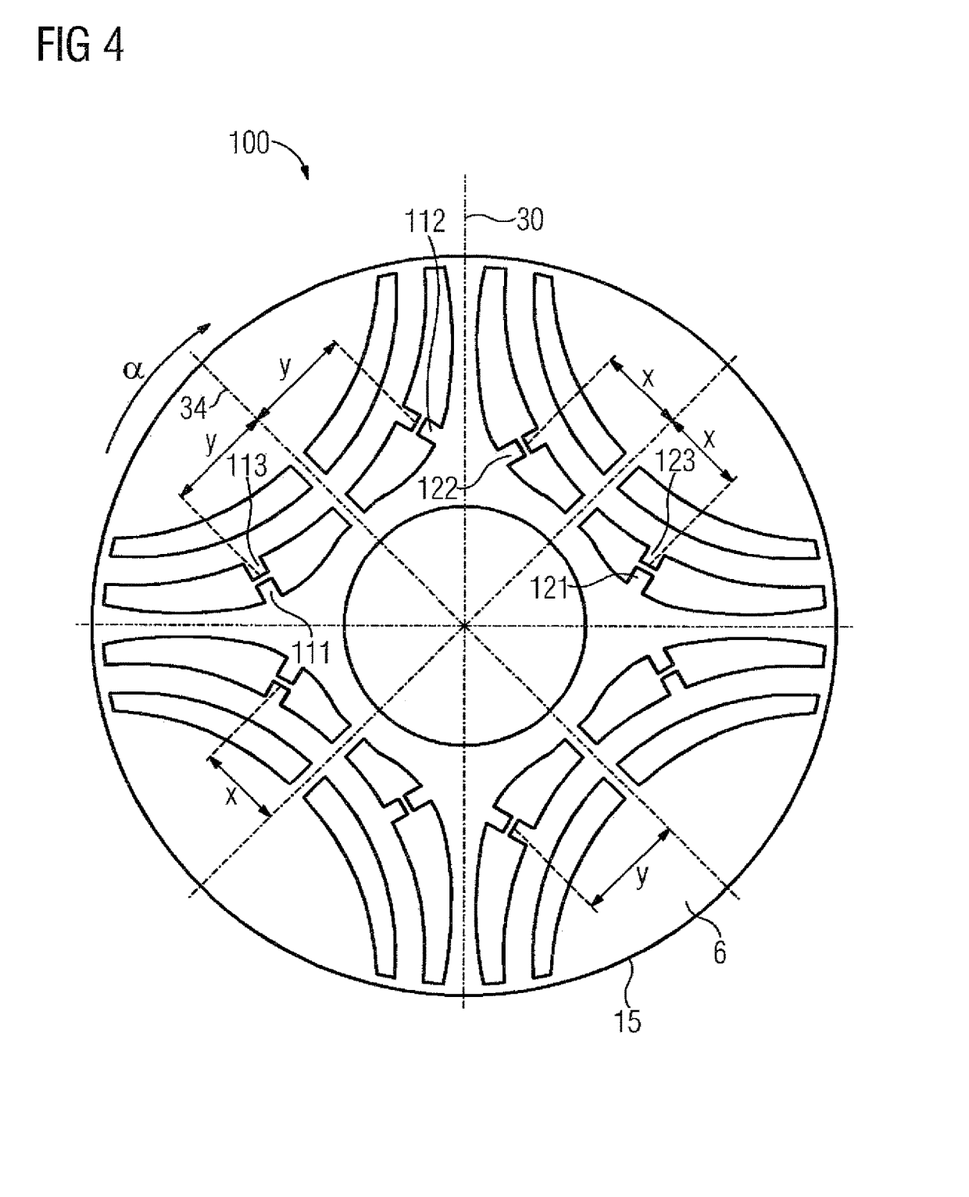
FIG. 4 is an exemplary embodiment of a lamination used in FIGS. 1 and 2 as an adjacent layer in the orientation of FIG. 4.

FIG. 3 shows an exemplary embodiment of a lamination 15 used in FIGS. 1 and 2 as an adjacent layer 200 in the orientation of FIG. 3. FIG. 4 shows an exemplary embodiment of a lamination 15 used in FIGS. 1 and 2 as a layer 100 in the orientation of FIG. 4. The laminations 15 in FIGS. 3 and 4 have the same dimensions and the same cut-outs and both are made reference to in the following description for ease of comprehension. If the lamination 15 for the layer 200 is rotated through a twist angle β, the lamination 15 assumes a position in which it is coincident in dimensions and cut-outs with the layer 100 in FIG. 3. Differently expressed, this means that fastened lamination regions 115, 116, 215, 216 have boundaries 1110, 1130, 2110, 2130 which each have at least one inwardly protruding web 111, 113, 211, 213 wherein each layer 100 results in relation to these boundaries 1110, 1130, 2110, 2130 from an adjacent layer 200 by rotation of the adjacent layer 200 through a twist angle β, wherein in each layer 100 at least one inwardly protruding web 121, 122, 123, 211, 212, 213 is arranged asymmetrically to at least one first inwardly protruding web 111, 112, 113, 221, 222, 223 with respect to a symmetry axis, the symmetry axis being an angle bisector 30 of the twist angle β. The at least one inwardly protruding web 211, 213 which is arranged asymmetrically to at least one first inwardly protruding web 111, 113 to the symmetry axis 30 is an adjacent inwardly protruding web 211, 213. In the exemplary embodiment of FIG. 3, the angle bisector 30 extends along a d-circle radius 30. The boundaries 1110, 1130, 2110, 2130 of the fastened lamination regions 115, 116, 215, 216 are between a first and a second circle radius axially symmetric to the symmetry axis (angle bisector 30). If a plurality of magnetic poles of the rotor 10 are present between the first and the second circle radius, a mechanical stabilization of an arrangement of a plurality of magnetic pole regions of the magnetic poles of the rotor 10 can advantageously take place economically in high quality in different radial directions 4 of the arrangement in advantageously equal amounts. Herein, the first circle radius in FIG. 3 extends along a half of the second circle radius along the second half of the horizontal line 32, so that in this view, the first circle radius comes to lie, by rotation through the twist angle 2*β on the second circle radius.

If there is also axial symmetry, when the second circle radius 34 results by rotation through the twist angle β from the first circle radius 33, then a mechanical stabilization of a magnetic pole of the rotor 10 can also advantageously take place economically in high quality in different radial directions of the arrangement, advantageously to the same degree.

The at least one inwardly protruding web 211, 213 can have a spacing x from the first circle radius 33 which is smaller than a spacing y of the at least one first inwardly protruding web 111, 113 from the second circle radius 34, wherein the twist angle β is measured from the first circle radius 33 to the second circle radius 34, wherein the at least one inwardly protruding web 211, 213 is present in the rotation direction α before the first circle radius 33 and the at least one first inwardly protruding web 111, 113 is present in the rotation direction α before the second circle radius 34.

A further inwardly protruding web 212 which is arranged asymmetrically to a further first inwardly protruding web 112 in relation to the symmetry axis 30 has a spacing x from the first circle radius 33 which is smaller than a spacing y of the further first inwardly protruding web 112 from the second circle radius 34, wherein the twist angle α is measured from the first to the second circle radius, wherein the further inwardly protruding web 212 is provided in the rotation direction α after the first circle radius 33 and the further first inwardly protruding web 112 is provided in the rotation direction α after the second circle radius 34. In the exemplary embodiments of FIGS. 1 to 4, the twist angle β is 90°. Thus the rotor 10 of FIG. 1 has four magnetic poles. In each case, a layer 100, 200 with fastened lamination regions 115, 215 has mutually adjacent circular sectors, which are each delimited by two d-circle radii 30, 32, wherein in each layer 100, 200 with fastened lamination regions 115, 215, though the lamination regions 6, 115, 116, 117, 126, 215, 216, 217 a plurality of bent, strip-shaped flux conduction portions are formed, respectively separated from one another by the flux barriers 11, 31, 1113, 3113, which each extend in their longitudinal extent transversely to a q-axis 33, 34 of the rotor 10, wherein the q-axis 33, 34 extends along an angle bisector of the two d-circle radii 30, 32. The exemplary embodiment of the rotor 10 of FIG. 1 is therefore a reluctance motor. In the exemplary embodiment of the adjacent layer 200 in FIG. 3, a q-axis 33 extends along the first circle radius 33 and the second q-axis 34 along the second circle radius 34.

Figure 5:
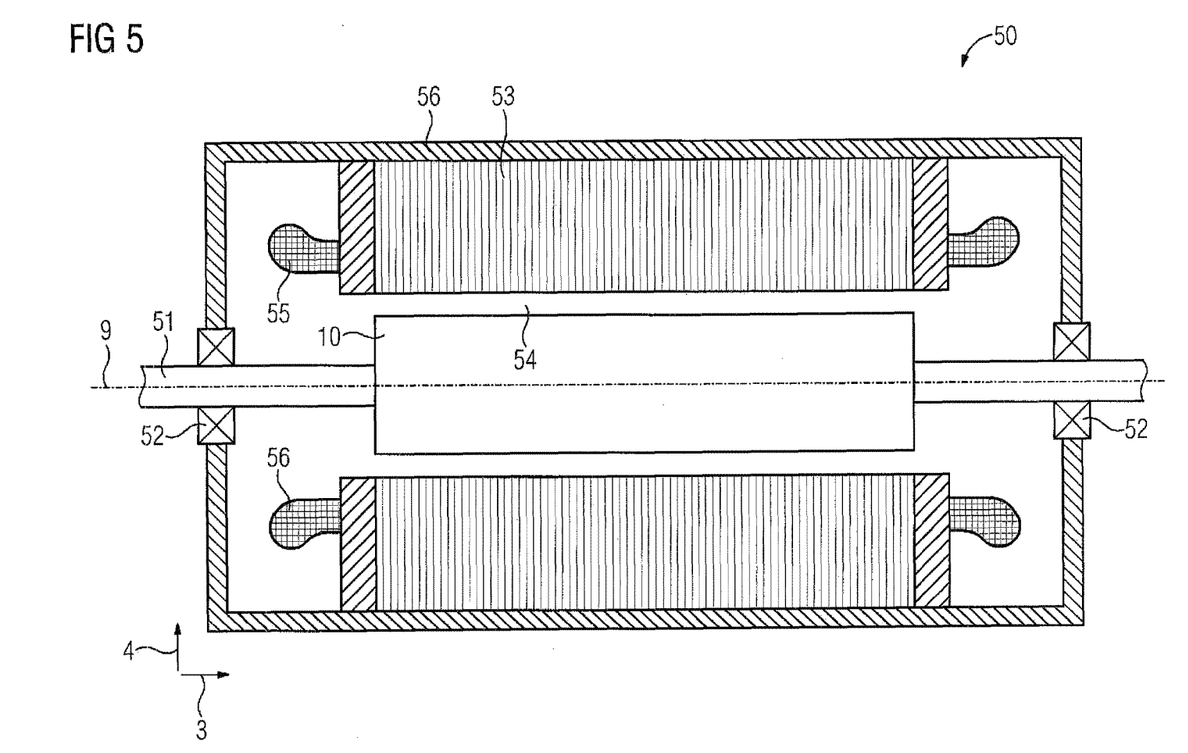
FIG. 5 is an exemplary embodiment of an electrical machine.

FIG. 5 shows an exemplary embodiment of an electrical machine 50 which comprises the rotor 10. The electrical machine 50 further comprises a stator 53 which, during operation of the electrical machine 50 cooperates magnetically across an air gap 54 with the rotor, wherein the rotor 10 is mounted rotatably about a rotation axis 9, wherein the rotation axis 9 extends in the axial direction 3. The rotor 10 is fastened to a shaft 51 which extends through the passage 12 of the rotor. The rotor 10 is rotatable via the shaft 51 with a first and a second bearing device 52 about the rotation axis 9 in a housing 56 of the electrical machine 50. The stator 53 is non-rotatably fastened in the housing 56 and has at least one winding 55 which extends in the axial direction 3 along the air gap 54. On operation of the electrical machine 50 with a rotor 10 as a motor, by means of the at least one winding 55, electrical energy is supplied and through the magnetic interaction between the magnetic poles of the stator 53 and the rotor 10 across the airgap 54, electrical energy is converted into mechanical energy. Herein, the rotor 10 is caused to rotate about the rotation axis 9 and mechanical energy can be output at the shaft 51 to a mechanical consumer in the form of a rotary movement. The magnetic poles of the stator 53 and of the rotor 10 can form during operation of the electrical machine if the stator has a plurality of windings 55, 56 which are fed with alternating currents of different phases of a three-phase alternating current source in order to generate a rotating field which brings about a rotary movement of the rotor 10 about the rotation axis 9.

Figure 6:
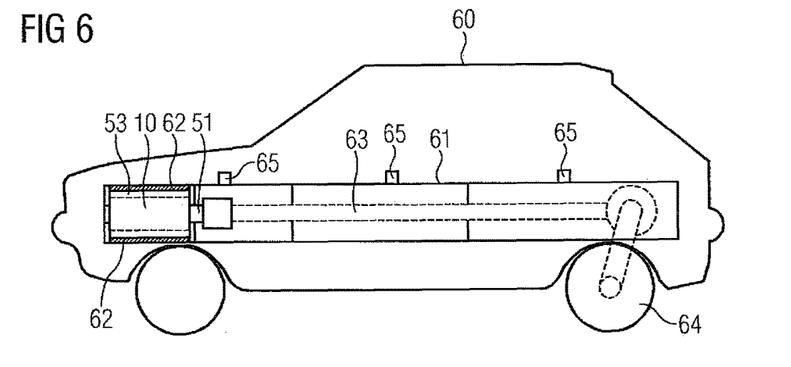
FIG. 6 is an exemplary embodiment of a motor vehicle.

FIG. 6 shows an exemplary embodiment of a motor vehicle 60 which comprises the rotor 10. The stator 53, which during operation of the motor vehicle 60 interacts magnetically across an air gap with the rotor 10, is fastened with a fastening apparatus 62, 65 to the motor vehicle 60. The fastening apparatus has a press-fit 62 with which the stator 53 is fastened in a sleeve 61 and holders 65 with which the sleeve 61 is fastened to the motor vehicle 60. The sleeve 61 thus surrounds at least a subregion of the motor vehicle 60, wherein the subregion comprises a drive train 63 of the motor vehicle 60. During operation of the motor vehicle 60, the drive train 63 transmits a rotary movement of the rotor 10 to a rear wheel 64 of the motor vehicle. For this purpose, the shaft 51 is coupled to the drive train 63.

Figure 7:
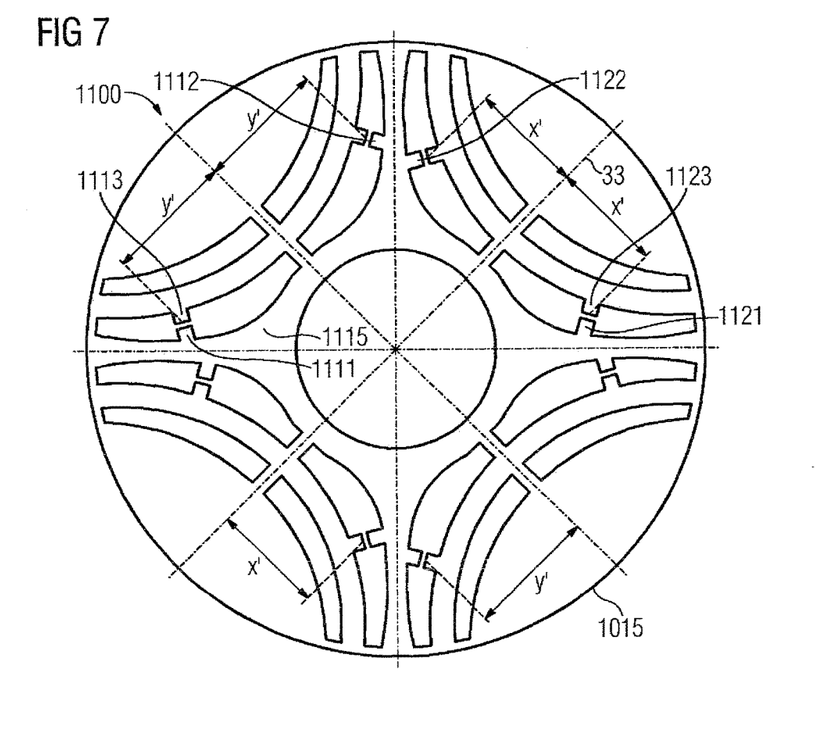
FIG. 7 is an exemplary embodiment of a lamination, for a third exemplary embodiment of a rotor, designated as a further adjacent layer.

FIG. 7 shows an exemplary embodiment of a lamination 1015 designated as a further adjacent layer 1100 for a third exemplary embodiment of a rotor, wherein in the rotor, the further adjacent layer 1100 is arranged between a layer 100 and a layer 200 adjacent to the layer 100. Herein, no inwardly protruding web which lies in the axial direction 3 over an inwardly protruding web (111, 112, 113, 121, 122, 124) of the layer 100 extends into the casting compound 5 of the flux barriers 11, 31, 1113, 3113 between the layer 100 and the adjacent layer 200. For this purpose, the at least one inwardly protruding web 1121 has a spacing x' from the first circle radius 33, which is greater than the spacing y of the at least one first inwardly protruding web 111, 113 from the second circle radius 34. The lamination 1115 of FIG. 7 is configured like the lamination 15, except that the spacing x' and a spacing y' greater than the spacing x' is present, wherein the spacings x', y' can advantageously be used in the same way economically in high quality for a mechanical stabilization of the rotor. In a fourth exemplary embodiment of a rotor, a sequence of layers in the axial direction 3 of a lamination 15 according to FIG. 4, a rotated lamination 15 according to FIG. 3, a lamination 1115 according to FIG. 7 and a rotated lamination 1115 according to FIG. 7 can thus be used. In a fifth exemplary embodiment of a rotor, a lamination is used which has four circle radii of which the inwardly protruding webs each have different spacings x, y, x', y'. Thus, by rotation of the lamination of one layer relative to the next layer in each case by 90°, it can be achieved that between the inwardly protruding web of one layer and the next web laying thereabove in the axial direction 3, three adjacent layers are present which enable a free space for the casting compound, between the inwardly protruding web and the inwardly protruding web laying thereabove, which is filled with casting compound.

Although the invention has been described in detail with the preferred exemplary embodiments, it is not restricted to the examples disclosed. Other variations can be derived therefrom by a person skilled in the art without departing from the scope of protection of the invention.

What is claimed is:

1. A rotor for an electrical machine, comprising:
    a laminated core extending in an axial direction: from a first axial end to a second axial end, said laminated core including layers stacked in the axial direction, each layer having a plurality of lamination regions; and
    flux barriers respectively arranged between adjacent ones of the lamination regions, at least one of the flux barriers being filled with a non-ferromagnetic casting compound from the first axial end to the second axial end,
    wherein at least one of the lamination regions in each layer is a fastened lamination region,
    wherein the fastened lamination region of one layer of the layers has at least one web protruding inwardly into the casting compound and extending at least partially in at least one direction which has a component in the axial direction, and
    wherein the fastened lamination region of another one of the layers adjacent to the one layer is positioned such as to be devoid of an inwardly protruding web which extends into the casting compound of the flux barriers and lies in the axial direction over the inwardly protruding web of the fastened lamination region of the one layer.

2. The rotor of claim 1, wherein one of the layers has an adjacent layer in which a first lamination region is present with an adjacent inwardly protruding web, said adjacent inwardly protruding web extending in a rotation direction adjacently following a first inwardly protruding web of the first respective lamination region of the one of the layers in the casting compound.

3. The rotor of claim 2, wherein each of the layers has a second lamination region as a fastened lamination region, with an inwardly protruding web of the first lamination region being separated as an opposite inwardly protruding web from a first inwardly protruding web of the second lamination region by the casting compound.

4. The rotor of claim 2, wherein the adjacent layer has a third lamination region with an adjacent inwardly protruding web which extends against the rotation direction following a first inwardly projecting web of the third lamination region of the one of the layers in the casting compound.

5. The rotor of claim 1, wherein the at least one inwardly protruding web of the fastened lamination region is established by a bending of a subregion of a lamination piece, said lamination piece including the fastened lamination region.

6. The rotor of claim 1, wherein the lamination regions of each layer are made from a lamination.

7. The rotor of claim 6, wherein the lamination is made of a magnetic steel sheet.

8. The rotor of claim 1, wherein the fastened lamination regions have boundaries, each boundary having at least one inwardly protruding web, wherein each one of the layers is formed in relation to the boundaries from an adjacent one of the layers by rotation of the adjacent layer through a twist angle, so that at least one inwardly protruding web in each one of the layers is arranged asymmetrically to at least one first inwardly protruding web in relation to a symmetry axis which is an angle bisector of the twist angle.

9. The rotor of claim 1, further comprising a further layer, said further layer continuing the stacked layers at the second axial end of the laminated core in the axial direction, said further layer having at most lamination regions no inwardly protruding webs.

10. The rotor of claim 1, wherein the layers with the fastened lamination regions have mutually adjacent circular sectors which are each delimited by two d-circle radii, wherein in the layers with the fastened lamination regions a plurality of bent, strip-shaped flux conduction portions are formed though the lamination regions and separated from one another by the flux barriers, each said conduction portion extending in a longitudinal direction transversely to a q-axis of the rotor, with the q-axis extending along an angle bisector of the two d-circle radii.

11. An electrical machine, comprising:
a rotor mounted for rotation about a rotation axis extending in an axial direction, said rotor including a laminated core extending in the axial direction from a first axial end to a second axial end, said laminated core including layers stacked in the axial direction, each layer having a plurality of lamination regions, and flux barriers respectively arranged between adjacent ones of the lamination regions, at least one of the flux barriers being filled with a non-ferromagnetic casting compound from the first axial end to the second axial end, wherein at least one of the lamination regions in each layer is a fastened lamination region, wherein the fastened lamination region of one layer of the layers has at least one web protruding inwardly into the casting compound and extending at least partially in at least one direction which has a component in the axial direction, and wherein the fastened lamination region of another one of the layers adjacent to the one layer is positioned such as to be devoid of an inwardly protruding web which extends into the casting compound of the flux barriers and lies in the axial direction over the inwardly protruding web of the fastened lamination region of the one layer; and
a stator cooperating magnetically with the rotor via an air gap during operation of the electrical machine.

12. A motor vehicle, comprising a rotor including a laminated core extending in an axial direction from a first axial end to a second axial end, said laminated core including layers stacked in the axial direction, each layer having a plurality of lamination regions, and flux barriers respectively arranged between adjacent ones of the lamination regions, at least one of the flux barriers being filled with a non-ferromagnetic casting compound from the first axial end to the second axial end, wherein at least one of the lamination regions in each layer is a fastened lamination region, wherein the fastened lamination region of one layer of the layers has at least one web protruding inwardly into the casting compound and extending at least partially in at least one direction which has a component in the axial direction, and wherein the fastened lamination region of another one of the layers adjacent to the one layer is positioned such as to be devoid of an inwardly protruding web which extends into the casting compound of the flux barriers and lies in the axial direction over the inwardly protruding web of the fastened lamination region of the one layer.

13. A laminated core for a rotor, comprising:
layers stacked in an axial direction to define a first axial end and a second axial end, each layer including a plurality of lamination regions; and
flux barriers respectively arranged between adjacent ones of the lamination regions, at least one of the flux barriers being filled with a non-ferromagnetic casting compound from the first axial end to the second axial end,
wherein at least one of the lamination regions in each layer is a fastened lamination region, wherein the fastened lamination region of one layer of the layers has at least one web protruding inwardly into the casting compound and extending at least partially in at least one direction which has a component in the axial direction,
wherein the inwardly protruding webs extend into free spaces of at least one flux barrier for the casting compound, and
wherein the fastened lamination region of another one of the layers adjacent to the one layer is positioned such as to be devoid of an inwardly protruding web which extends into the casting compound of the flux barriers and lies in the axial direction over the inwardly protruding web of the fastened lamination region of the one layer.

14. A method for manufacturing a rotor, comprising:
stacking layers in an axial direction to establish a lamination core, with each layer having a plurality of lamination regions, at least one of the lamination regions in each layer having at least one web which extends at least partially in at least one direction which has a component in the axial direction;
forming free spaces between adjacent lamination regions for receiving flux barriers such that the free spaces of at least one flux barrier are filled in the axial direction between the webs that inwardly protrude into the free spaces; and
positioning a lamination region of one layer of the layers and a lamination region of another adjacent one of the layers such that the lamination region of the adjacent one of the layers is devoid of an inwardly protruding web which extends into the casting compound of the flux barriers and lies in the axial direction over the inwardly protruding web of the fastened lamination region of the one layer.

15. A method of using laminations for a rotor, comprising:
stacking layers having a plurality of fastened lamination regions in an axial direction of a laminated core extending in the axial direction from a first axial end to a second axial end;
adjoining at least one flux barrier to the fastened lamination regions, with the at least one flux barrier being filled with a non-ferromagnetic casting compound;
inwardly protruding webs of the fastened lamination regions into the casting compound, with the webs extending at least partially in at least one direction which has a component in the axial direction; and
positioning a lamination region of one layer of the layers and a lamination region of another adjacent one of the layers such that the lamination region of the adjacent one of the layers is devoid of an inwardly protruding web which extends into the casting compound of the flux barriers and lies in the axial direction over the inwardly protruding web of the fastened lamination region of the one layer.

\* \* \* \* \*